United States Patent [19]

Fujino

[11] Patent Number: 4,732,684

[45] Date of Patent: * Mar. 22, 1988

[54] METHOD FOR PREVENTING THE BULKING OF ACTIVATED SLUDGE

[75] Inventor: Kiyoharu Fujino, Yokkaichi, Japan

[73] Assignee: Mitsubishi Monsanto Chemical Company, Tokyo, Japan

[ * ] Notice: The portion of the term of this patent subsequent to Mar. 8, 2005 has been disclaimed.

[21] Appl. No.: 943,720

[22] Filed: Dec. 19, 1986

[30] Foreign Application Priority Data

Dec. 27, 1985 [JP] Japan ................... 60-295890

[51] Int. Cl.⁴ .................................. C02F 3/12
[52] U.S. Cl. ...................... 210/631; 210/736
[58] Field of Search ............. 210/631, 736, 734, 609

[56] References Cited

U.S. PATENT DOCUMENTS

| | | | |
|---|---|---|---|
| 3,855,299 | 12/1974 | Witt | 210/736 |
| 4,098,693 | 7/1978 | Tonkyn et al. | 210/736 |
| 4,341,632 | 7/1982 | Gregor et al. | 210/631 |
| 4,452,699 | 6/1984 | Suzuki et al. | 210/631 |

FOREIGN PATENT DOCUMENTS

| | | | |
|---|---|---|---|
| 49-3468 | 1/1974 | Japan . | |
| 58-95596 | 6/1983 | Japan | 210/631 |
| 58-95593 | 6/1983 | Japan | 210/631 |
| 1408111 | 10/1975 | United Kingdom . | |

OTHER PUBLICATIONS

Schwartz Propwchak & Becker, Journal of Water Pollution Control Federation (USA), 1980, vol. 52, no. 12, pp. 2977–2993.

Walker & Wheale, Environmental Technology Letters, 1981, vol. 2, pp. 129–140.

Primary Examiner—Benoit Castel
Attorney, Agent, or Firm—Oblon, Fisher, Spivak, McClelland & Maier

[57] ABSTRACT

A method for preventing the bulking of activated sludge, which comprises adding to the activated sludge a water-soluble cationic polymer obtained by a reaction of a dialkylamine, ammonia and epichlorohydrin, in an amount of from 0.05 to 25 parts by weight relative to 100 parts by weight of the dried solid content of the activated sludge.

4 Claims, No Drawings

METHOD FOR PREVENTING THE BULKING OF ACTIVATED SLUDGE

FIELD OF THE INVENTION

The present invention relates to a method for preventing the bulking of activated sludge. More particularly, an abnormal growth of activated sludge whereby the sludge swells due to excessive proliferation of Sphaerotilus or molds in the activated sludge or for some other reason, is called "bulking", and the present invention relates to a method for preventing the occurrence of such bulking due to an abnormal phenomenon of microorganisms.

Sewerage, night soil and various organic industrial waste waters are usually treated by an activated sludge method. It is known that during the treatment by this method, the microorganism phase in the activated sludge undergoes a change in response to the change in the flow rate of the inflow waste water or the change of the organic substances in the inflow waste water. If such a change of the microorganism phase is abrupt, a so-called bulking phenomenon occurs, where the sludge swells, the sedimentation tends to be poor, the sludge rises towards the water surface, the overflow of the sludge increases, the treating capacity decreases and, in an extreme case, the treatment becomes impossible. When this phenomenon takes place, the sludge tends to be whitish, very light and hardly sedimentable, and its BOD reducing efficiency tends to be extremely low.

SVI (Sludge Volume Index) is used as an index to determine whether activated sludge is properly functioning. This SVI is expressed by the volume occupied by the sedimented sludge when 1 g of activated sludge was subjected to sedimentation for 30 minutes. The SVI of a properly functioning activated sludge is from 50 to 150, particularly not higher than 100. Whereas, the SVI of the activated sludge which has undergone bulking is likely to be as high as from 300 to 400. Once such bulking has taken place, it is not easy for the activated sludge to recover its proper function, and in the worst case, it will be necessary to replace the sludge. In the case of such replacement in a plant, it will be necessary to cease the operation until the fresh sludge is cultured and activated to a proper level, and such replacement seriously affects the production plan of the plant.

DESCRIPTION OF THE RELATED ART

Methods for preventing the bulking phenomenon of activated sludge have been proposed, for instance, in Japanese Examined Patent Publications No. 14274/1983 and No. 14275/1983.

Japanese Examined Patent Publication No. 14274/1983 discloses a method wherein at least one dithiocarbamate having a specific structure is dissolved in water and added to activated sludge. However, this method is intended solely for a case where the bulking has been caused by an abnormal proliferation of filamentous fungi, and this method is not effective when the bulking is caused by any other factors. Besides, according to this method, it takes at least four days until the effects become distinctive even when the damage to the activated sludge is relatively slight, and in some cases, it takes ten days or more for the effects to be distinctive. Further, there is an additional drawback that a large amount of the agent must be added everyday continuously. The method disclosed in Japanese Examined Patent Publication No. 14275/1983, comprises adding to waste water a composition containing one or more amino acids such as valine, leucine, isoleucine, glutamic acid, phenylalanine and tyrosine, as active ingredients, so that the active ingredients are eventually incorporated to the activated sludge. According to this method, the composition containing these active ingredients is required to be added continuously for at least 3 hours at a rate of from 0.5 to 3 kg/m$^3$ to the inflow waste water, and there is a drawback that it takes at least 24 hours until the effects will be obtained.

The bulking phenomenon of the activated sludge is caused not only by the abnormal proliferation of pilamentous fungi such as Sphaerotilus, Thiothrix, Asperqillus and Penicillium, but also by the formation of highly viscous jelly-like substance in the activated sludge particularly during the winter time, whereby the sludge tends to be hardly sedimentable and likely to exhibit a bulking phenomenon. In the latter case, it is said to be effective to add $ZnCl_2$ or a cationic polyacrylamide polymer flocculating agent to the waste water to flocculate the activated sludge. However, according to the experiments conducted by the present inventors, it has been found that according to this method, the activated sludge is apt to contain air bubbles in an aeration tank, and the activated sludge containing such air bubbles has very poor capability for the treatment of the waste water and does not show distinctive effects for the prevention of the bulking phenomenon.

SUMMARY OF THE INVENTION

It is an object of the present invention to provide a method for preventing the bulking phenomenon of activated sludge, particularly a trouble attributable to an abnormal phenomenon of microorganisms such as the bulking due to the abnormal proliferation of filamentous fungi and the bulking due to the formation of highly viscous substance in the winter time, whereby the treating operation will be easy and the SVI reducing effect can be regained in a short period of the time.

The present invention provides a method for preventing the bulking of activated sludge, which comprises adding to the activated sludge a water-soluble cationic polymer obtained by a reaction of a dialkylamine, ammonia and epichlorohydrin, in an amount of from 0.05 to 25 parts by weight relative to 100 parts by weight of the dried solid content of the activated sludge.

DESCRIPTION OF THE PREFERRED EMBODIMENTS

Now, the present invention will be described in detail with reference to the preferred embodiments.

In the method of the present invention, a water-soluble cationic polymer obtained by a reaction of a dialkylamine, ammonia and epichlorohydrin is added to activated sludge. As the dialkylamine, dimethylamine, diethylamine, diprophylamine, methylethylamine, methylpropylamine and ethylpropylamine may be mentioned.

Ammonia may be added in a very small amount relative to the dialkylamine. The amount may be selected within a range of ammonia/dialkylamine = 0.0001 to 0.6 by molar ratio, preferably 0.001 to 0.1 by molar ratio.

For the reaction of the dialkylamine, ammonia and epichlorohydrin, the epichlorohydrin is used in substantially the same molar amount as the total molar amount of the dialkylamine and ammonia, and the reaction is conducted by using a closed type reactor equipped with a stirrer under an inert atmosphere by maintaining the internal temperature of the reactor within a temperature range of from 30° to 100° C.

More specifically, an aqueous solution containing from 20 to 70% by weight of a dialkylamine and ammonia is charged in a closed-type reactor equipped with a stirrer, a reflux condenser, a thermometer, etc., the atmosphere in the reactor is replaced by nitrogen gas, and while controlling the internal temperature of the reactor not to increase too much under stirring, epichlorohydrin is added continuously or intermittently. After the completion of the addition of epichlorohydrin and ammonia to the reactor, an oxide or hydroxide of an alkali metal or alkaline earth metal is added to the reactor in an amount of from 0.00001 to 0.01 mol relative to 1 mol of epichlorohydrin, and the reaction system is maintained within a temperature range of from 30° to 60° C. for a few hours, whereby the molecular weight of the resulting polymer can be increased. Further, if this reaction product is maintained in the form of an aqueous solution under a nitrogen gas atmosphere at a temperature of about 30° C., the reaction to increase the molecular weight proceeds slowly for about 2 months. If air or oxygen is introduced during this period, the reaction to increase the molecular weight ceases to proceed.

The molecular weight of the polymer as the reaction product can be judged by the intrinsic viscosity $[\eta]$ obtained by calculation from the measurement of its solution in a 2 M KBr aqueous solution. In the method of the present invention, it is preferred to employ the polymer having an intrinsic viscosity $[\eta]$ of at least 0.05, more preferably at least 0.1, most preferably at least 0.2.

If the amount of the water-soluble cationic polymer is too small, the object of the invention can not be achieved. On the other hand, if the amount is excessive, the polymer will be discharged out of the system together with the waste water. Therefore, the amount is selected within a range of from 0.05 to 25 parts by weight relative to 100 parts by weight of the dried solid content of the activated sludge. A range of from 0.1 to 10 parts by weight is preferred.

For the addition of such a water-soluble cationic polymer to the activated sludge, an aqueous solution of the water-soluble cationic polymer is prepared, and any one of the following methods or any combination thereof may be employed:

(1) A method wherein the aqueous solution is mixed into the inflow waste water, and the mixture is sent to an aeration tank;

(2) A method wherein the aqueous solution is directly added to an aeration tank or a sedimentation tank where the bulking of activated sludge is taking place; and (3) A method wherein the aqueous solution is added to the sludge for recycling.

When the water-soluble cationic polymer is added to the activated sludge within the above-mentioned range, no increase in SVI is usually observed for at least 2 month, although such depends upon the removal rate of the excess sludge. Whenever a sign for an increase in SVI is observed, the water-soluble cationic polymer may be added at that time within the above-mentioned range.

The method of the present invention is as described above, and exhibits the following remarkable effects. Thus, its value for industrial application is extremely high.

(1) According to the method of the present invention, an increase in SVI of activated sludge can be prevented within a short period of time simply by adding the water-soluble cationic polymer to the activated sludge treatment system.

(2) According to the method of the present invention, no swelling of the activated sludge in an aeration tank takes place, and it is possible to minimize the sedimentation volume, to maintain the activated sludge concentration at a high level and to remarkably improve the effects for reducing BOD.

(3) According to the method of the present invention, the sedimentation and separation of the activated sludge are extremely simple also in a sedimentation tank. Besides, the volume of the sediment (sedimentation volume) can be substantially reduced, whereby excess activated sludge is hardly formed, and frequent removal of excess activated sludge and consequential incineration treatment thereof will not be required.

Now, the present invention will be described in further detail with reference to Examples. However, it should be understood that the present invention is by no means restricted to such specific Examples.

EXAMPLE 1

Waste water having COD of 380 ppm was supplied to four aeration tanks each having a capacity of 370 $m^3$ at a rate of 35 $m^3$/hr per tank, and the concentration of activated sludge was adjusted to 3,500 ppm (as the dry solid content relative to the waste water). Further, the waste water in the aeration tanks was adjusted so that the ratio of COD:nitrogen elements:phosphorous element was 100:5:1, and the pH was 7. Then, air was blown into each aeration tank at a rate of 800 liters/hr.

The liquid treated as above, was sent to a sedimentation tank having a capacity of 500 $m^3$, and the sludge was permitted to settle naturally. The supernatant liquid and the concentrated liquid of activated sludge were separated, and the supernatant liquid was discharged to a river. The concentrated liquid of activated sludge was returned as recycling sludge to the aeration tanks at a rate of 80 $m^3$/hr. Out of the concentrated liquid of activated sludge, 1 $m^3$/hr was taken out as excess activated sludge, to which a flocculating agent was added to flocculate the sludge, followed by centrifugal dehydration to obtain a dehydrated cake having a water content of 90%. The above described waste water treatment was continued for a long period of time, whereupon SVI of the activated sludge in the aeration tanks reached 320.

A polymer which was a reaction product of dimethylamine, ammonia and epichlorohydrin (molar ratio of dimethylamine/ammonia/epichlorohydrin=100/1/100) and which had an intrinsic viscosity of 0.26 as measured in a 2 M KBr aqueous solution, was dissolved in water to obtain an aqueous solution having a polymer concentration of 30% by weight, as a treating solution. To the waste water supplied to the aeration tanks at the above-mentioned rate, the above treating solution was added in an amount of 300 kg as the dry weight of the polymer solid content over a period of 4 hours. After the completion of the addition of the treating solution, SVI of the activated sludge in the aeration tanks was investigated and found to have sharply dropped to 87. Further, the concentration of the activated sludge in the sedimentation tank following the aeration tanks increased substantially from 7,500 ppm prior to the addition of the treating solution to 12,100 ppm after the addition. Further, no change was observed in the change of the dissolved oxygen concentration and in the reduction of BOD due to the addition of the treating solution.

For one month after the addition of the above treating solution according to the method of the present invention, no rising of the sedimentation surface level of activated sludge in the sedimentation tank was observed, and there was no necessity for the treatment of excess sludge. Accordingly, the amount of the dehydrated cake to be incinerated decreases.

COMPARATIVE EXAMPLE 1

From an aeration tank of Example 1, activated sludge having SVI of 320 and a solid concentration after drying of 3,500 ppm, was sampled in a beaker.

A polymer which was a reaction product of dimethylamine, ammonia and epichlorohydrin (molar ratio of the three components=100/1/100) and which had an intrinsic viscosity of 0.03 as measured in a 2 M KBr aqueous solution, was dissolved in water to obtain an aqueous solution having a polymer concentration of 30% by weight, as a treating solution.

The treating solution was added to the above sludge in a various amount within a range of from 50 to 400 ppm, and the reduction of SVI of the activated sludge was observed. Even when the above treating solution was added to the sampled activated sludge within the above range, the sedimentation speed of the sludge was slow, and SVI did not decrease beyond 160.

COMPARATIVE EXAMPLE 2

In the same manner as in Comparative Example 1, the reduction of SVI of the activated sludge was observed by using as the treating solution, four types of aqueous solutions of commercially available cationic polyacrylamides i.e. KP355 (manufactured by Dia Flock K.K.), Dia Clear MK5000 (trade name, manufatrued by Mitsubishi Chemical Industries Limited), Sun Flock C450 (trade name, manufactured by Sanyo Kasei K.K.) and Kuricrock (trade name, manufactured by Kurita Kogyo K.K.) and by varying the respective amounts of addition.

Substantially the same behavior was observed in all of the above four types of treating solutions. Namely, a satisfactory flock for sedimentation started to from when the dry weight of the solid content in each treating solution was about 50 ppm relative to the activated sludge, and no change was observed in the formation of the flock for sedimentation within a range of from 100 to 400 ppm. Further, in every case, SVI of the activated sludge after the addition of the treating solution did not decrease beyond 120.

I claim:

1. A method for preventing the bulking of activated sludge, which comprises adding to the activated sludge a water-soluble cationic polymer having an intrinsic viscosity of at least 0.05 as measured in a 2 M KBr aqueous solution obtained by the reaction of a dialkylamine, ammonia and epichlorohydrin, in an amount of from 0.05 to 25 parts by weight relative to 100 parts by weight of the dried solid content of the activated sludge.

2. The method for preventing the bulking of activated sludge according to claim 1, wherein the water-soluble cationic polymer is selected from those having an intrinsic viscosity of at least 0.1 as measured in a 2 M KBr aqueous solution.

3. The method for preventing the bulking of activated sludge according to claim 1, wherein the dialkylamine is dimethylamine, diethylamine, dipropylamine, methylethylamine, methylpropylamine or ethylpropylamine.

4. The method for preventing the bulking of activated sludge according to claim 1, wherein the water-soluble cationic polymer is added in an amount of from 0.1 to 10 parts by weight relative to 100 parts by weight of the dried solid content of the activated sludge.

* * * * *